United States Patent [19]

Pawsat et al.

[11] 4,113,395
[45] Sep. 12, 1978

[54] BICYCLE STEM AND FORK TUBE ASSEMBLY

[75] Inventors: Carlton P. Pawsat; Robert F. Humlong, both of Maysville, Ky.

[73] Assignee: Wald Manufacturing Company, Inc., Maysville, Ky.

[21] Appl. No.: 782,662

[22] Filed: Mar. 30, 1977

Related U.S. Application Data

[63] Continuation of Ser. No. 573,746, May 1, 1975.

[51] Int. Cl.² ............................................. F16B 2/14
[52] U.S. Cl. ..................................... 403/22; 403/374; 280/279
[58] Field of Search ................ 403/22, 374, 104, 290, 403/297; 74/551.3, 551.1, 551.6; 85/79, 76, 75; 280/279, 278, 280

[56] References Cited

U.S. PATENT DOCUMENTS

| 564,741 | 7/1896 | Dunn | 403/362 |
|---|---|---|---|
| 618,681 | 1/1899 | Jerome | 403/290 |
| 624,232 | 5/1899 | Marty, Jr. | 403/104 |
| 1,276,708 | 8/1918 | Bair | 85/75 |
| 1,379,784 | 5/1921 | Schwartz | 403/290 |
| 2,280,662 | 4/1942 | Pawsat | 403/370 |
| 2,487,661 | 11/1949 | McCauley, Jr. | 74/551.6 |
| 3,787,131 | 1/1974 | Reachek | 403/290 X |
| 3,836,272 | 9/1974 | Duer | 403/359 |

FOREIGN PATENT DOCUMENTS

| 784,113 | 4/1935 | France | 74/551.1 |
|---|---|---|---|
| 707,628 | 4/1954 | United Kingdom | 280/279 |

*Primary Examiner*—Andrew V. Kundrat
*Attorney, Agent, or Firm*—J. Warren Kinney, Jr.

[57] ABSTRACT

The fork tube and wedge nut of a bicycle stem and fork tube assembly are provided with complementary, non-circular, interengaging abutment areas which substantially enhance and augment the frictional locking relationship between a conventional wedge nut and fork tube by which a stem is secured to a fork tube.

16 Claims, 19 Drawing Figures

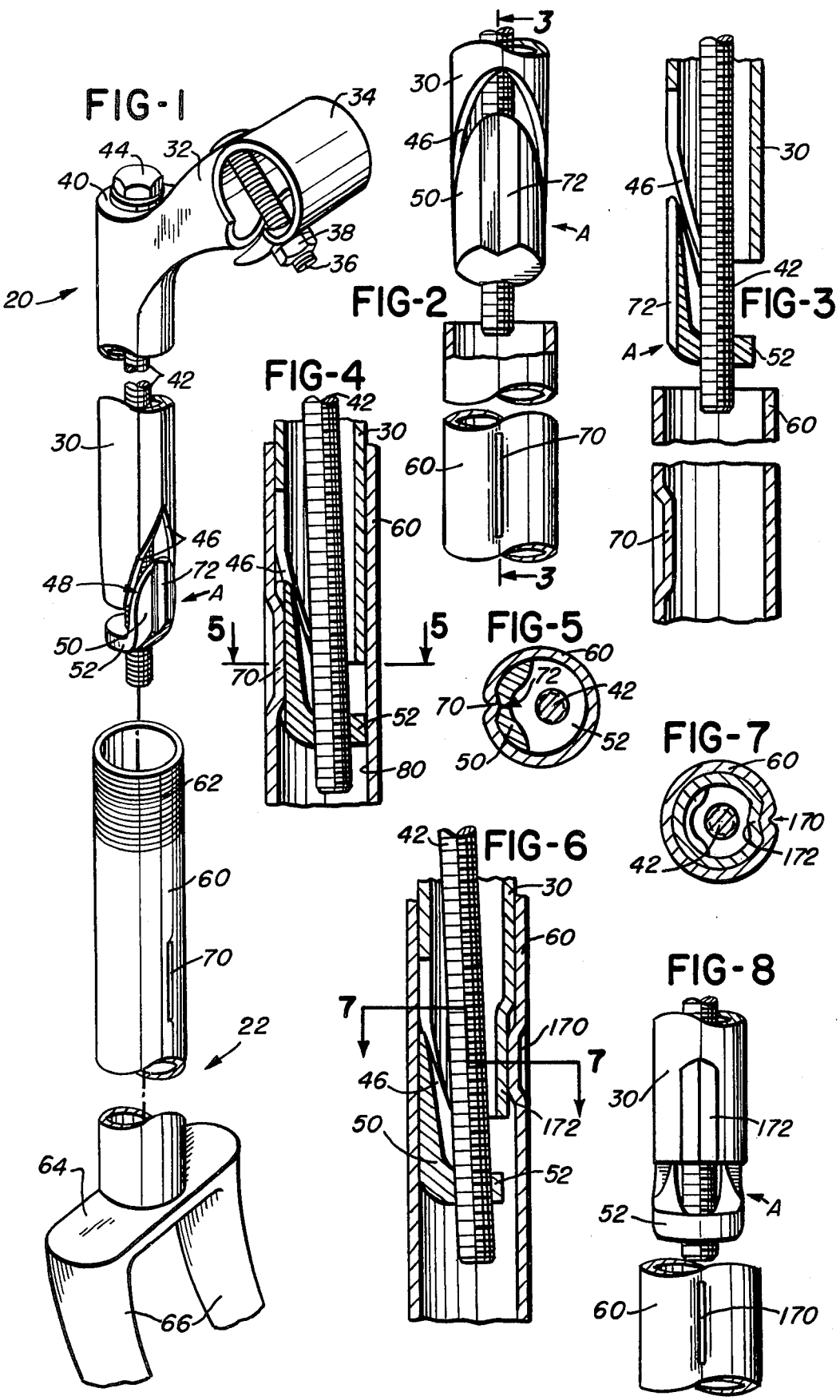

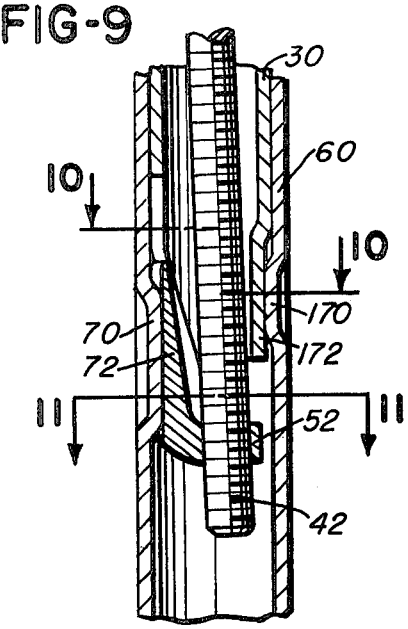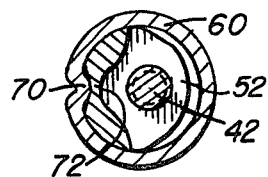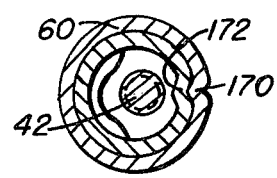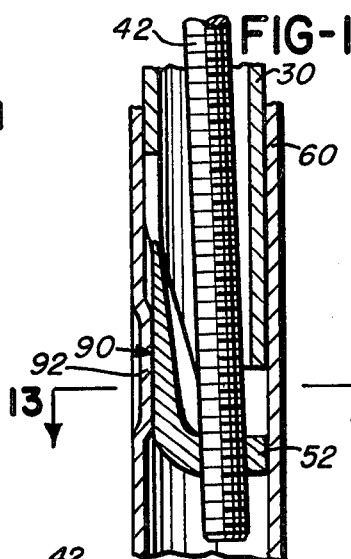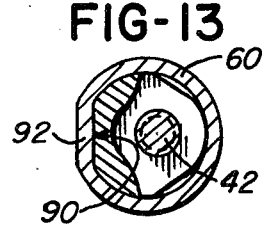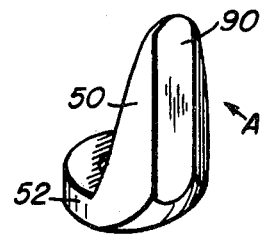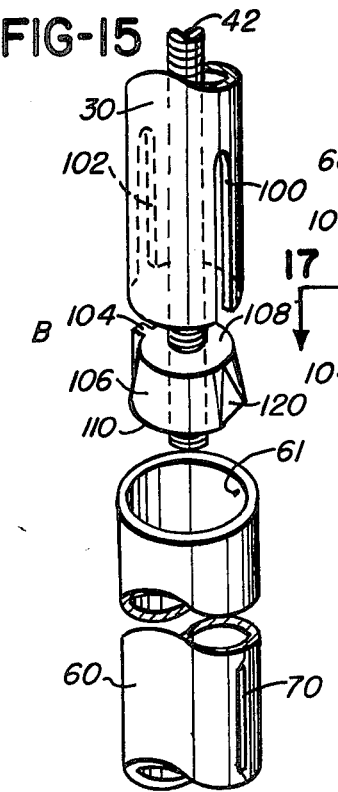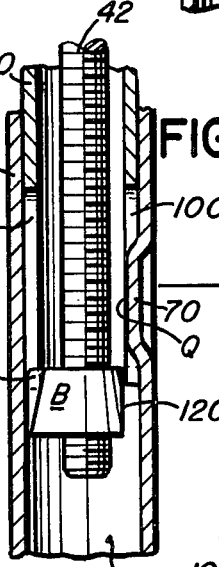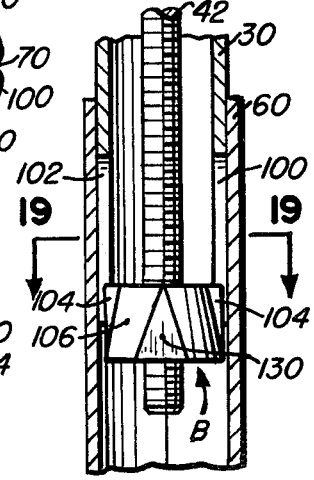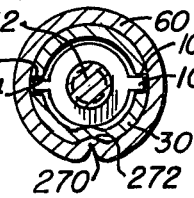

BICYCLE STEM AND FORK TUBE ASSEMBLY

This is a continuation of application Ser. No. 573,746, filed May 1, 1975.

BACKGROUND OF THE INVENTION

1. Field of the Invention

The field of the invention relates to bicycle stem and fork tube assemblies of the type wherein an elongate bolt which passes through the stem, engages a lock nut which, upon rotation of the bolt is moved relative to the end of the stem and the interior of the fork tube in which the stem is housed, for effecting frictional engagement between the wedge nut and fork tube to secure the stem in the fork tube.

2. Description of the Prior Art

Each of the following U.S. patents disclose means for effecting a frictional locking engagement between the stem and fork tube of a bicycle assembly: U.S. Pat. Nos. 1,994,303; 2,133,010; 2,357,553; 2,383,273; 2,487,661; 2,505,648; 3,310,325; 3,361,455; 3,787,126; and 3,385,615.

U.S. Pat. No. 2,280,662 discloses a steering post for cycles and the like, wherein a surface of the wedge nut is provided with a plurality of axial flutes which are adapted to enhance the frictional engagement between the lock nut and inner surface of the fork tube.

U.S. Pat. No. 3,006,230 discloses a wedge nut fabricated from sheet metal having wedging end portions which are adapted to frictionally engage the inner surface of a fork tube.

SUMMARY OF THE INVENTION

The subject invention is directed to the provision of simple, yet highly effective, means for securing a bicycle stem to a fork tube by means of a conventional wedge nut, one or more surfaces of which have been altered to provide non-circular areas which are the complement of other non-circular areas which are provided interiorly of the fork tube, and wherein the non-circular areas of the fork tube and wedge nut are such as to be placed in contacting abutment incident to movement of the wedge lock. The subject invention utilizes not only the frictional engagement between surfaces of a wedge nut and the inner surface of a fork tube, but it augments the frictional engagement by means of the complementary non-circular areas on the wedge nut and fork tube whereby to effectively lock the stem relative to the fork tube.

An object of the present invention is to provide simple, inexpensive, foolproof means for securely, though releasably, locking a bicycle stem relative to a fork tube in such a manner as to effectively resist the application of an appreciable turning torque to the stem relative to the fork tube and its associated fork of a front wheel bicycle assembly.

Heretofore, as disclosed in U.S. Pat. Nos. 2,505,648; 2,280,662; 3,361,455; 2,487,661; 3,310,325; 3,787,126; 1,994,303; 2,850,308; 2,357,553; 2,383,273; and 3,006,230, the barrel of a bicycle stem has been secured against relative turning motion in the fork tube by means of a lug or wedge nut having an inclined camming surface which engaged a complementary camming surface at the end of the stem barrel. Upon manipulation of an expander bolt, the lug or wedge nut is drawn upwardly toward the lower end of the stem barrel, whereby to be laterally displaced into frictional engagement with the inside of the fork tube by reason of the aforesaid camming surfaces.

The prior art devices, as aforesaid, were satisfactory for effecting a moderate locking relationship of a bicycle stem relative to the fork tube.

The present invention is directed to the provision of simple, yet highly efficient means which greatly enhance and augment the locking relationship between the wedge nut and fork tube by means of which the barrel of a bicycle stem is securely, though releasably, anchored to the fork tube. The subject means do not require extra parts, but only necessitate a minor redesign of the lug or wedge nut, fork tube and, in some instances, modification of the free lower end of the stem barrel.

DESCRIPTION OF THE DRAWINGS

FIG. 1 is a perspective, exploded view of a bicycle stem and fork tube assembly embodying the teachings of the present invention.

FIG. 2 is a rear elevational view of the bicycle stem being introduced into the upper end of the fork tube.

FIG. 3 is a sectional view taken on line 3—3 of FIG. 2.

FIG. 4 is a view similar to FIG. 3 illustrating the relationship of the parts when the stem barrel and wedge nut have been introduced into the fork tube.

FIG. 5 is a sectional view taken on line 5—5 of FIG. 4.

FIG. 6 discloses a first modification of the invention.

FIG. 7 is a sectional view taken on line 7—7 of FIG. 6.

FIG. 8 is a view similar to FIG. 2, but illustrating the details of the modification of FIG. 6.

FIG. 9 is a sectional view similar to FIG. 4 illustrating a second modification of the invention.

FIG. 10 is a sectional view taken on line 10—10 of FIG. 9.

FIG. 11 is a sectional view taken on line 11—11 of FIG. 9.

FIG. 12 is a view similar to FIG. 4 showing a third modification of the invention.

FIG. 13 is a sectional view taken on line 13—13 of FIG. 12.

FIG. 14 is a perspective view of the wedge nut of FIG. 12.

FIG. 15 is a view similar to FIG. 2 illustrating a fourth modification of the invention.

FIG. 16 is a sectional view of the elements of FIG. 15 when in fully assembled, locking relationship.

FIG. 17 is a sectional view taken on line 17—17 of FIG. 16.

FIG. 18 is a view similar to FIG. 4 showing a fifth modification of the invention.

FIG. 19 is a sectional view taken on line 19—19 of FIG. 18.

DESCRIPTION OF THE PREFERRED EMBODIMENTS

With particular references now to FIG. 1, the numeral 20 indicates generally a bicycle stem, whereas the numeral 22 designates a conventional fork tube assembly.

Stem 20 comprises an elongate, straight, substantially cylindrical barrel or lower portion 30 having an integral neck portion 32 which terminates in a handlebar member or loop 34 for the reception of a handlebar, not illustrated. The handlebar member or loop 34 is adapted to be tightly clamped onto a handlebar, such as, by means of a bolt 36 and nut 38. A boss 40 is provided at the junction of barrel 30 and neck portion 32, said boss having provided therein an opening to receive an elongate expander bolt 42, the upper end of which terminates in bolt head 44.

The lower end of barrel 30 is provided with a pair of inclined camming surfaces 46 which are selectively engageable by the complementary camming surface 48 of the upstanding leg 50 of a wedge nut A. Leg 52 is provided with an internally threaded opening for threaded engagement with the lower portion of expander bolt 42.

The fork tube assembly comprises an elongate, hollow, substantially cylindrical tube 60, the upper end of which is suitably threaded, as at 62, to receive a member, not illustrated, by which the fork tube assembly is securely, though releasably, fastened to a socket of a bicycle frame, not illustrated. The lower end of tube 60 is permanently fastened, such as by means of welding or the like, to upper member 64 of a fork stem which includes a pair of elongate downwardly extending, laterally spaced members 66.

With particular reference now to FIGS. 1–5, it will be noted that the rear surface of fork tube 60 is provided with an elongate, inwardly projecting indentation which produces a corresponding non-circular area interiorly of the tube. Uniformly satisfactory results have been obtained in those instances in which the fork tube is supported throughout 360° in a suitable holding fixture, not illustrated, after which an elongate punch is utilized to provide the elongate indentation, 70, in the tube. The indentation, thus formed, is reinforced to such an extent that it constitutes a non-deformable, rigid abutment which projects into the tube in a manner as clearly illustrated in FIGS. 3, 4, and 5.

As best illustrated in FIGS. 1 and 5, the outer surface of upstanding leg 50 of the lug or wedge nut A is rounded whereby to conform to the inside diameter of fork tube 60. An elongate recess 72, which defines a non-circular area, is provided lengthwise of leg 50, which is complementary to elongate indentation 70, which defines a non-circular area of the fork tube.

Wedge nut A is carried by expander bolt 42 and the lower end of barrel 30 are inserted axially into fork tube 60 with recess 72 of the wedge nut being disposed in axial alignment with indentation 70 of the fork tube, for disposing the parts in the relative relationship illustrated in FIG. 4. Rotation of bolt head 44 will shift wedge nut A relative to barrel 30 and fork tube 60 until such time as further relative movement is prevented by reason of camming surfaces 46 and 48 forcing the circular peripheral edge of lower leg 52 into frictional engagement with inner surface 80 of the fork tube, thereby effectively precluding endwise axial movement of barrel 30 relative to the fork tube. The interengaging relationship of recess 72 of wedge nut A with indentation 70 of the fork tube will effectively preclude rotational movement of barrel 30 of the stem relative to the fork tube 60.

In the modification illustrated in FIGS. 6, 7, and 8, the fork tube is provided with an elongate indentation 170 and the lower end of barrel 30 is provided with an elongate recess 172 which is complementary to the inner surface of indentation 170, as best illustrated in FIG. 7. It will be noted that upstanding leg 50 of the wedge nut A has not been provided with an elongate recess, as in FIGS. 1–5. The interengaging relationship of recess 172 of barrel 30 and indentation 170 of the fork tube will effectively preclude accidental or unintentional relative rotational movement of the barrel and fork tube.

The modification illustrated in FIGS. 9, 10, 11 disclose, in effect, a combination of the locking arrangement of FIGS. 1–5, and FIGS. 6–8, it being noted that one side of fork tube 60 is provided with an elongate indentation 70, whereas the other side is provided with an elongate indentation 170, preferably disposed in diametric relationship with respect to indentation 70.

The upstanding leg 50 of the wedge nut A is provided with an elongate recess 72, whereas the lower end of barrel 30 is provided with an elongate recess 172. When the expander bolt 42 has been turned sufficiently to effect the locking arrangement illustrated in FIG. 9, rotational movement of the stem barrel relative to the fork tube is resisted by the interengaging relationship of recesses 72 of the wedge nut with indentation 70 of the fork tube and by reason of recess 172 in the lower end of barrel 30 with indentation 170 of fork tube 60.

FIGS. 12, 13, and 14 disclose a locking arrangement wherein upstanding leg 50 of the wedge nut A is provided with an elongate, substantially flat axial surface 90, and wherein a portion of fork tube 60 has been provided with an elongate, flattened portion 92. Surfaces 90 and 92 define non-circular abutment areas.

The modification of FIGS. 12–14 differs from that of FIGS. 1–5 in that the wedge nut and fork tube are provided with interengaging surfaces which are defined by non-circular abutment areas that are flat, rather than arcuate, or V shaped.

FIGS. 15, 16, and 17 disclose an assembly wherein the lower end of barrel 30 is provided with a pair of elongate, diametrically spaced, elongate slots 100 and 102. A wedge nut B is adapted to threadably engage the lower end of expander bolt 42, said nut including an outwardly projecting, elongate, axial rib 104, which is adapted to be received within elongate slot 102. As clearly illustrated in FIGS. 15 and 16, the outer surface 106 of wedge nut B is conical in that it tapers outwardly from upper end 108 to lower end 110. The outer diameter of upper end 108 is dimensioned whereby to be slidably received upwardly into the lower free end of barrel 30 incident to rotation of expander bolt 42 for thereby expanding the lower end of the barrel outwardly against the inner surface 61 of fork tube 60.

Fork tube 60 is provided with an elongate, non-circular abutment area as defined by the elongate indentation 70 which, as clearly illustrated in FIGS. 16 and 17, is receivable within elongate slot 100 of barrel 30 of the stem. A flat, axial surface 120 is provided in a surface of the wedge nut directly opposite rib 104 for enabling the wedge nut to pass by indentation 70 of the fork tube as the stem and wedge nut is initially inserted therein. It will be noted that barrel 30 of the stem is thus positively locked against rotation in the fork tube by reason of the engagement of indentation 70 in slot 100. Those portions of the conical surface 106 of the wedge nut which are disposed interiorly of the lower end of barrel 30 of the stem effectively maintain the aforesaid interlocking relationship between slot 100 and indentation 70.

FIGS. 18 and 19 disclose a fork tube 60 which has been provided with an elongate indentation 270 defining a non-circular abutment area, and wherein barrel 30 has been provided with a complementary, non-circular abutment area in the form of an elongate recess area 272, in the lower end of the barrel and intermediate elongate slots 100 and 102. As disclosed in FIG. 18, tapered surface 106 of the wedge nut has been provided with a flat, axial surface 130 for enabling the wedge nut to freely pass by the abutment area 272 as the stem and wedge nut are initially inserted into the fork tube. The non-circular abutment areas 270 and 272 are maintained in positive, contacting relationship, adjacent the lower end of barrel 30 of the stem by reason of the relationship of tapered surface 106 of the wedge nut interiorly of the lower end of barrel 30.

From the foregoing, it will be noted that we have provided simple, yet highly effective, means for securing a stem barrel to and against relative rotation with respect to a fork tube by altering the contour of a conventional wedge nut whereby to provide an elongate recess in the outer surface thereof which recess is the complement of and adapted to be disposed in interlocking engagement with elongate abutment provided interiorly of the fork tube.

It will be noted that the subject invention is applicable to those stems which utilize wedge nuts of the type illustrated in FIGS. 1–14, designated generally by the letter A, as well as to the conical, expander type wedge nuts illustrated in FIGS. 15–18, as designated by the letter B.

What is claimed is:

1. A bicycle stem and fork tube assembly comprising:
   an elongate, hollow, substantially cylindrical fork tube having an interior surface with a predetermined interior diameter;
   a stem including an elongate, hollow, substantially cylindrical barrel having an outer surface with a predetermined outer diameter;
   a wedge nut having an outer surface and an outer diameter which is slightly less than said fork tube interior diameter;
   an abutment defined in the interior surface of the fork tube at a predetermined axial location thereon with the remainder of said surface at said predetermined axial location being essentially smooth, said abutment being defined by an elongate flat surface having a length less than the overall length of said interior surface;
   a relieved area comprising an elongate flat surface defined in said wedge nut outer surface at an axial location thereon predetermined to cooperate with said abutment, said wedge nut having an outer diameter just slightly smaller than said fork tube interior diameter and said axial location being selected so that said wedge nut is slidably receivable in said fork tube with said relieved area and said abutment contacting each other, said contacting being effected as soon as said wedge nut is slidably received in said fork tube far enough to align said abutment and relieved area whereby relative rotation between said wedge nut and fork tube is prevented without further adjustments of said wedge nut and fork tube; and
   an elongate bolt passing through said stem and threadably engaging said wedge nut for imparting endwise longitudinal motion to said nut relative to said stem and fork tube for maintaining said relieved area and abutment in interlocking engagement with each other.

2. An assembly as called for in claim 1, wherein the abutment is defined by an elongate impression defined in the wall of said fork tube, and wherein the wedge nut relieved area is defined by an elongate area dimensioned to receive and axially engage the projection interiorly of the fork tube.

3. An assembly as called for in claim 1 wherein the stem barrel is provided with a relieved area defined by an elongate axial, open ended groove dimensioned to receive and axially engage the abutment interiorly of the fork tube.

4. An assembly as called for in claim 1, wherein each abutment and relieved area is elongate whereby to accommodate various interlocked, axial positions of the stem relative to the fork tube.

5. As assembly as called for in claim 1, wherein the barrel of the stem terminates in a free, lower end which defines an inclined camming surface, and wherein the wedge nut includes an inclined camming surface whereby endwise longitudinal movement of the wedge nut toward the stem advances its camming surface on the camming surface of the stem barrel while simultaneously advancing the relieved area of the wedge nut against and in interlocking relationship with the abutment of the fork tube.

6. An assembly as called for in claim 1, wherein the stem barrel terminates in a free lower end having a pair of diametrically disposed, elongate, open-ended slots therein, one of which constitutes an elongate relieved area dimensioned to receive the abutment which is defined within the fork tube, and wherein the wedge nut includes an inclined, conical, camming surface having an elongate, axial tongue on one side thereof and an axial flat in said conical surface opposite said tongue, whereby endwise, longitudinal movement of the wedge nut toward the stem advances the conical, camming surface into the lower end of the stem barrel while advancing the tongue into the other slot of said barrel, said axial flat facilitating the introduction of the wedge nut into and beyond the abutment of the fork tube.

7. An assembly as called for in claim 1, wherein the fork tube includes a second abutment disposed internally thereof, and wherein the lower end of the barrel of the stem includes an elongate relieved area which is the complement of the said second abutment area.

8. An assembly as called for in claim 7, wherein each of the said abutments and relieved area are elongate whereby to accommodate various axial positions of the barrel of the stem relative to the fork tube.

9. An assembly as called for in claim 7, wherein the said second abutment of the fork tube is disposed in diametric relationship with respect to the first mentioned abutment thereof.

10. An assembly as called for in claim 1, wherein the barrel stem terminates in a free lower end having a pair of diametrically disposed, elongate, open-ended slots therein and wherein the wedge nut includes an inclined, conical, camming surface having a pair of elongate, axial tongues on opposite sides thereof, and an axial flat in said conical surface intermediate said tongues, whereby endwise, longitudinal movement of the wedge nut toward the stem advances the conical, camming surface into the lower end of the barrel stem while advancing the tongues into the slots of the barrel for disposing and maintaining the said recesses in interlocking engagement with said abutment, said axial flat facilitating the introduction of the wedge nut into and beyond the abutment of the fork tube.

11. A bicycle stem and fork tube assembly comprising:
   a. an elongate, hollow, substantially cylindrical fork tube having an elongate indention in the outer surface thereof which defines an elongate, non-circular, integral, abutment area disposed interiorly of the fork tube, said abutment area having a length less than the overall length of said fork tube;
b. a stem including an elongate, hollow, substantially cylindrical barrel slidably receivable within said fork tube and terminating in a free, lower, beveled end;
c. a wedge nut slidably receivable in said fork tube having a first surface which is beveled and complementary to and engageable with the beveled end of said stem barrel, and having a second surface having an elongate, non-circular abutment area therein, wherein said abutment area is the complement of the abutment area within the fork tube; and
d. an elongate bolt extending through said stem and threadably engaging said wedge nut for imparting endwise longitudinal movement to it relative to said stem barrel and fork tube for advancing the beveled surface thereof along and in contacting relationship with the beveled end of the stem barrel for disposing the said non-circular abutment areas of the fork tube and wedge nut in abutting, face-to-face relationship, whereby to prevent rotational movement of said stem relative to the fork tube.

12. A bicycle stem and fork tube assembly comprising:
a. an elongate, hollow, substantially cylindrical fork tube having an abutment interiorly thereof, said abutment being defined by an elongate projection impressed into the wall thereof;
b. a stem including an elongate, hollow, substantially cylindrical barrel having an outer surface slidably received in said fork tube;
c. a wedge nut having an outer surface slidably receivable in said fork tube, said wedge nut being provided with a recess defined by an elongate groove dimensioned to receive and axially engage the projection interiorly of the fork tube; and
d. an elongate bolt passing through said stem and threadably engaging said wedge nut for imparting endwise longitudinal motion to it relative to said stem and fork tube for disposing and maintaining said recess in interlocking engagement with said abutment.

13. An assembly as called for in claim 12, wherein the abutment interiorly of the fork tube constitutes material of the tube which has been displaced by an indentation formed in the outer surface thereof.

14. A bicycle stem and fork tube assembly comprising:
a. an elongate, hollow, substantially cylindrical fork tube having an abutment, said abutment being defined at a predetermined axial location by an elongate projection in the interior surface thereof, the remainder of the fork tube interior surface at the predetermined axial location being essentially smooth;
b. a stem including an elongate, hollow, substantially cylindrical barrel having an outer surface slidably receivable in said fork tube, said stem barrel terminating in a free, lower end which defines an inclined camming surface;
c. a wedge nut having an outer surface slidably receivable in said fork tube, said wedge nut including a recess defined in the surface thereof and an inclined camming surface whereby endwise longitudinal movement of the wedge nut toward the stem advances its camming surface on the camming surface of the stem barrel while simultaneously advancing the recess of the wedge nut against and in interlocking relationship with the abutment of the fork tube; and
d. an elongate bolt passing through said stem and threadably engaging said wedge nut for imparting endwise longitudinal motion to it relative to said stem and fork tube for disposing and maintaining said recess in interlocking engagement with said abutment.

15. A bicycle stem and fork tube assembly comprising:
a. an elongate, hollow, substantially cylindrical fork tube having an abutment interiorly thereof;
b. a stem including an elongate, hollow, substantially cylindrical barrel having an outer surface slidably receivable in said fork tube, said stem barrel terminating in a free lower end having a pair of diametrically disposed, elongate, open-ended slots therein, one of which constitutes an elongate recess dimensioned to receive the abutment within the fork tube;
c. a wedge nut having an outer surface slidably receivable in said fork tube, said wedge nut including an inclined, conical, camming surface having an elongate, axial tongue on one side thereof and an axial flat in said conical surface opposite said tongue, whereby endwise, longitudinal movement of the wedge nut toward the stem advances the conical, camming surface into the lower end of the stem barrel while advancing the tongue into the other slot of said barrel, said axial flat facilitating the introduction of the wedge nut into and beyond the abutment of the fork tube; and
d. an elongate bolt passing through said stem and threadably engaging said wedge nut for imparting endwise longitudinal motion to it relative to said stem and fork tube for disposing and maintaining said recess in interlocking engagement with said abutment.

16. A bicycle stem and fork tube assembly comprising:
a. an elongate, hollow, substantially cylindrical fork tube having an abutment interiorly thereof;
b. a stem including an elongate, hollow, substantially cylindrical barrel having an outer surface slidably receivable in said fork tube, said barrel stem terminating in a free lower end having a pair of diametrically disposed, elongate, open-ended slots therein and a recess defined therein;
c. a wedge nut having an outer surface slidably receivable in said fork tube, said wedge nut including an inclined, conical, camming surface having a pair of elongate, axial tongues on opposite sides thereof, and an axial flat in said conical surface intermediate said tongues, whereby endwise, longitudinal movement of the wedge nut toward the stem advances the conical, camming surface into the lower end of the barrel stem while advancing the tongues into the slots of the barrel for disposing and maintaining the said barrel recess in interlocking engagement with said fork tube abutment, said axial flat facilitating the introduction of the wedge nut into and beyond the abutment of the fork tube; and
d. an elongate bolt passing through said stem and threadably engaging said wedge nut for imparting endwise longitudinal motion to it relative to said stem and fork tube for disposing and maintaining said recess in interlocking engagement with said abutment.

* * * * *